(12) United States Patent
Greenlund et al.

(10) Patent No.: US 10,717,222 B2
(45) Date of Patent: Jul. 21, 2020

(54) MULTI-LANE DIE

(71) Applicant: NORDSON CORPORATION, Westlake, OH (US)

(72) Inventors: Michael P. Greenlund, Eau Claire, WI (US); David J. Kuenne, Chippewa Falls, WI (US); Matthew S. Frisinger, Chippewa Falls, WI (US); Charlotte K. Erickson, Eau Claire, WI (US)

(73) Assignee: Nordson Corporation, Westlake, OH (US)

(*) Notice: Subject to any disclaimer, the term of this patent is extended or adjusted under 35 U.S.C. 154(b) by 225 days.

(21) Appl. No.: 15/793,624

(22) Filed: Oct. 25, 2017

(65) Prior Publication Data

US 2019/0118449 A1  Apr. 25, 2019

(51) Int. Cl.
| | |
|---|---|
| *B29C 48/30* | (2019.01) |
| *B29C 48/345* | (2019.01) |
| *B29C 48/31* | (2019.01) |
| *B05C 5/02* | (2006.01) |
| *B05C 9/06* | (2006.01) |

(Continued)

(52) U.S. Cl.
CPC ............. *B29C 48/30* (2019.02); *B05C 5/027* (2013.01); *B05C 5/0266* (2013.01); *B05C 9/06* (2013.01); *B29C 48/25686* (2019.02); *B29C 48/302* (2019.02); *B29C 48/304* (2019.02); *B29C 48/31* (2019.02); *B29C 48/345* (2019.02); B05C 5/0254 (2013.01); B29C 48/2566 (2019.02); B29C 48/49 (2019.02)

(58) Field of Classification Search
CPC . B29C 48/2566; B29C 48/2586; B29C 48/30; B29C 48/302; B29C 48/304; B29C 48/31; B29C 48/345; B29C 48/49; B29C 48/25686; B05C 5/0254; B05C 5/0266; B05C 5/027

See application file for complete search history.

(56) References Cited

U.S. PATENT DOCUMENTS

| | | | |
|---|---|---|---|
| 3,032,008 A * | 5/1962 | Land | G03C 7/10 118/411 |
| 4,106,437 A * | 8/1978 | Bartlett | B05C 5/0254 118/412 |
| 4,476,165 A | 10/1984 | McIntyre | |

(Continued)

OTHER PUBLICATIONS

ISA/220—Notification of Transmittal of Search Report and Written Opinion of the ISA, or the Declaration dated Jan. 25, 2019 for WO Application No. PCT/US18/057210.

*Primary Examiner* — Xiao S Zhao
*Assistant Examiner* — Joseph S Leyson
(74) *Attorney, Agent, or Firm* — Baker & Hostetler LLP

(57) ABSTRACT

A multi-lane die is provided. The multi-lane slot die comprises an upper body member, a lower body member, an upper shim, a separator shim, and a lower shim. The upper shim is positioned between the upper body member and the separator shim. The upper shim, the upper body member, and the separator shim define a first at least one dispensing channel that extends to a first at least one dispense opening of the multi-lane die. The lower shim is positioned between the separator shim and the lower body member. The lower shim, the separator shim, and the lower body member define a second at least one dispensing channel that extends to a second at least one dispense opening of the multi-lane die.

14 Claims, 15 Drawing Sheets

(51) Int. Cl.
 *B29C 48/25* (2019.01)
 *B29C 48/49* (2019.01)

(56) References Cited

U.S. PATENT DOCUMENTS

| | | | |
|---|---|---|---|
| 5,700,325 A * | 12/1997 | Watanabe | B05C 5/0254 118/411 |
| 2004/0256496 A1 | 12/2004 | Harris et al. | |
| 2016/0008839 A1 | 1/2016 | Ukegawa | |
| 2017/0072411 A1 | 3/2017 | Ayers | |

* cited by examiner

MULTI-LANE DIE

TECHNICAL FIELD

The present disclosure relates to dies, and more particularly, to an improved multi-lane die and a method of using the multi-lane die.

BACKGROUND

Dies are used for discharging molten polymers, fluids, slurries, or other substances. Dies deliver at least one lane and at least one layer of a substance by forcing the substance out of a reservoir through a die outlet. The substance is then fed to a roll stack, a substrate, or other receiving element.

To produce multiple lanes of different substances being discharged from the die, multiple channels are formed within the die. In conventional systems, multiple channels are formed by using multi-manifold dies that include three or more die bodies. For example, in a two lane die, one channel is formed between an upper die body and a center die body, and another channel is formed between the center die body and a lower die body. Multi-manifold dies are expensive to manufacture, can be time consuming to assemble, difficult to use, and can be large in size.

Therefore, there is a need for an improved multi-lane die having a more compact design that saves cost and to increases ease of use.

SUMMARY

Disclosed herein are multi-lane dies and methods for using multi-lane dies for dispensing two or more substances into two or more lanes. Unlike prior dies, the multi-lane die described herein minimizes assembly and disassembly time, reduces manufacturing cost, and is generally more compact by having fewer die bodies. The multi-lane die include multiple shims positioned between an upper die body and a lower die body. One of the multiple shims include an upper shim that can be patterned as desired to create any number of coating lanes. The coating lanes may be placed to adjoin or even layer on top of one another. Another of the multiple shims includes a separator shim that separates the substances received in an upper portion and lower portion of the die. A benefit of the multi-lane die described herein is that a multi-lane coating can be established in a single manifold die.

In one aspect, the multi-lane die has a first at least one dispense opening and a second at least one dispense opening, and includes an upper body member, a lower body member, an upper shim, a separator shim, and a lower shim. The upper body member has an upper inner surface, an upper exterior surface, and at least one upper channel that extends from the upper inner surface to the upper exterior surface. The upper shim is positioned adjacent to and below the upper inner surface of the upper body member. The upper shim has at least one inner edge that defines at least one opening positioned adjacent to the at least one upper channel of the upper body member. The separator shim is positioned adjacent to and below the upper shim. The separator shim has an upper surface and a lower surface. The upper surface of the separator shim, the at least one inner edge of the upper shim, and the upper inner surface of the upper body member define a first at least one dispensing channel that extends from the at least one upper channel to the first at least one dispense opening. The lower shim is positioned adjacent to and below the lower surface of the separator shim. The lower shim has at least one inner edge that defines at least one opening. The lower body member is positioned adjacent to and below the lower shim. The lower body member has a lower inner surface, a lower rear surface, and at least one lower channel extending from the lower inner surface to the lower rear surface. The at least one opening of the lower shim is positioned adjacent to the at least one lower channel. The lower surface of the separator shim, the at least one inner edge of the lower shim, and the lower inner surface of the lower body member define a second at least one dispensing channel that extends from the at least one lower channel to the second at least one dispense opening.

In another aspect, the multi-lane die includes a lower body, an upper body, an upper lane shim, a separator shim, and a lower lane shim. The lower body and the upper body each define at least one channel within. The upper lane shim is positioned below the upper body and has one or more openings. The separator shim is positioned below the upper lane shim. The lower lane shim is positioned below the separator shim and has one or more openings. The lower body is below the lower lane shim. A first at least one channel is defined by the one or more openings of the upper lane shim positioned between the upper body and the separator shim, and a second at least one channel is defined by the one or more openings of the lower lane shim positioned between the separator shim and the lower body. The first at least one channel is in fluid communication with the at least one channel of the upper body, and the second at least one channel is in fluid communication with the at least one channel of the lower body.

Another aspect of the present disclosure provides a shim assembly for a multi-lane die that has an upper body member and a lower body member. The shim assembly includes an upper shim, a separator shim, and a lower shim. The upper shim is positioned adjacent to the upper body member and has at least one inner edge that defines at least one opening. The separator shim is positioned adjacent to the upper shim and has an upper surface and a lower surface. The upper surface of the separator shim, the at least one inner edge of the upper shim, and the upper body member define a first at least one dispensing channel. The lower shim is positioned adjacent to the lower surface of the separator shim and has at least one inner edge that defines at least one opening. The lower surface of the separator shim, the at least one inner edge of the lower shim, and the lower body member define a second at least one dispensing channel.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

A more detailed understanding may be had from the following description, given by way of example in conjunction with the accompanying drawings, wherein.

DETAILED DESCRIPTION

A multi-lane die for coating a substrate (not shown), such as plastic film, release liner, paper, and other types of substrates, is described. Unlike prior dies, the multi-lane die described herein is generally more compact and allows different fluids to be placed in any proximity within a single manifold die. The multi-lane die includes a blank center, or separator, shim that acts as a barrier between fluids. Conventionally, barriers between fluids are accomplished by using multiple die bodies and multiple manifolds. The multi-lane die may comprise a slot die.

Figure 1:
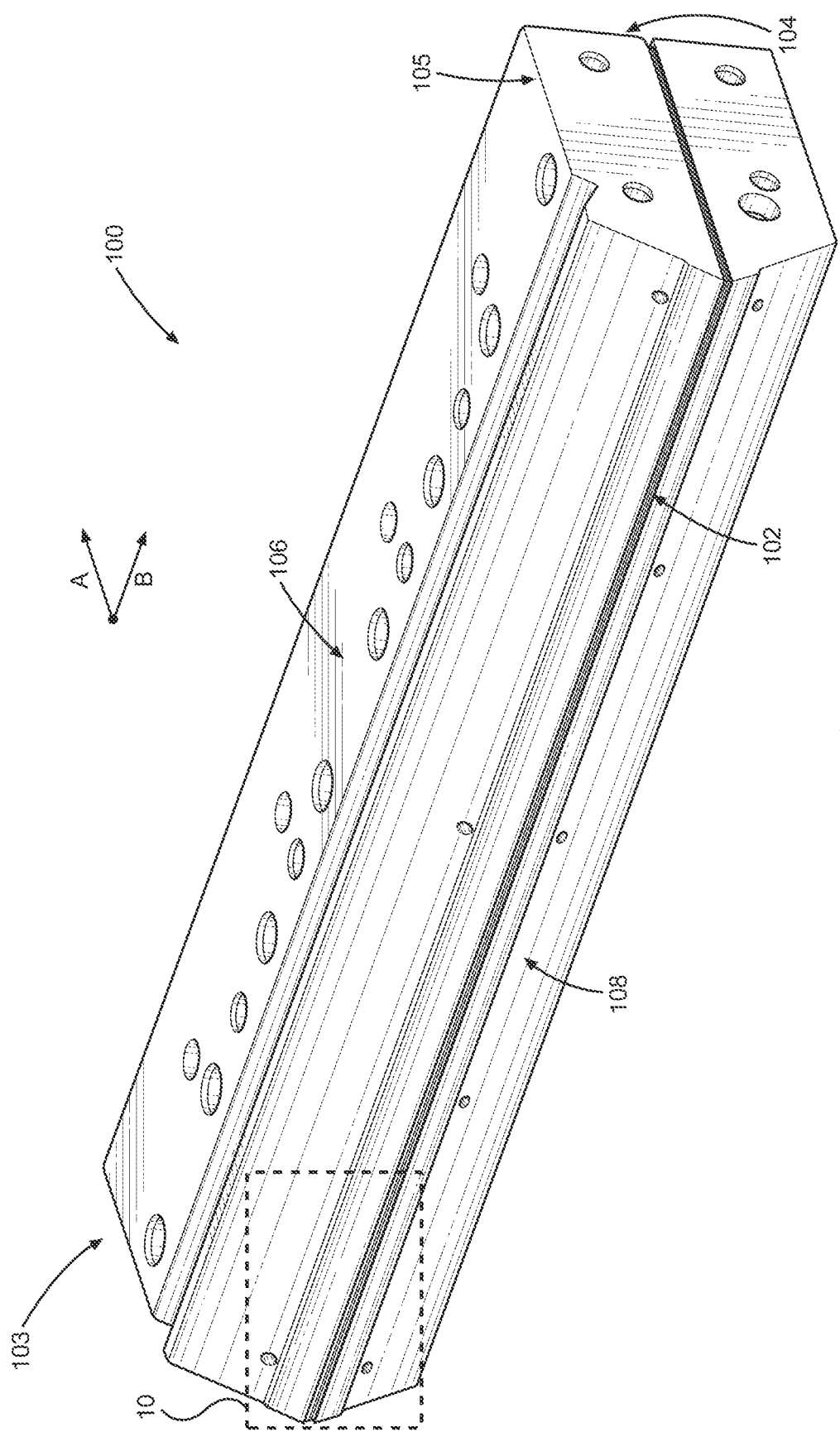
FIG. 1 illustrates a front perspective view of a die, according to an aspect of this disclosure.
Figure 2:
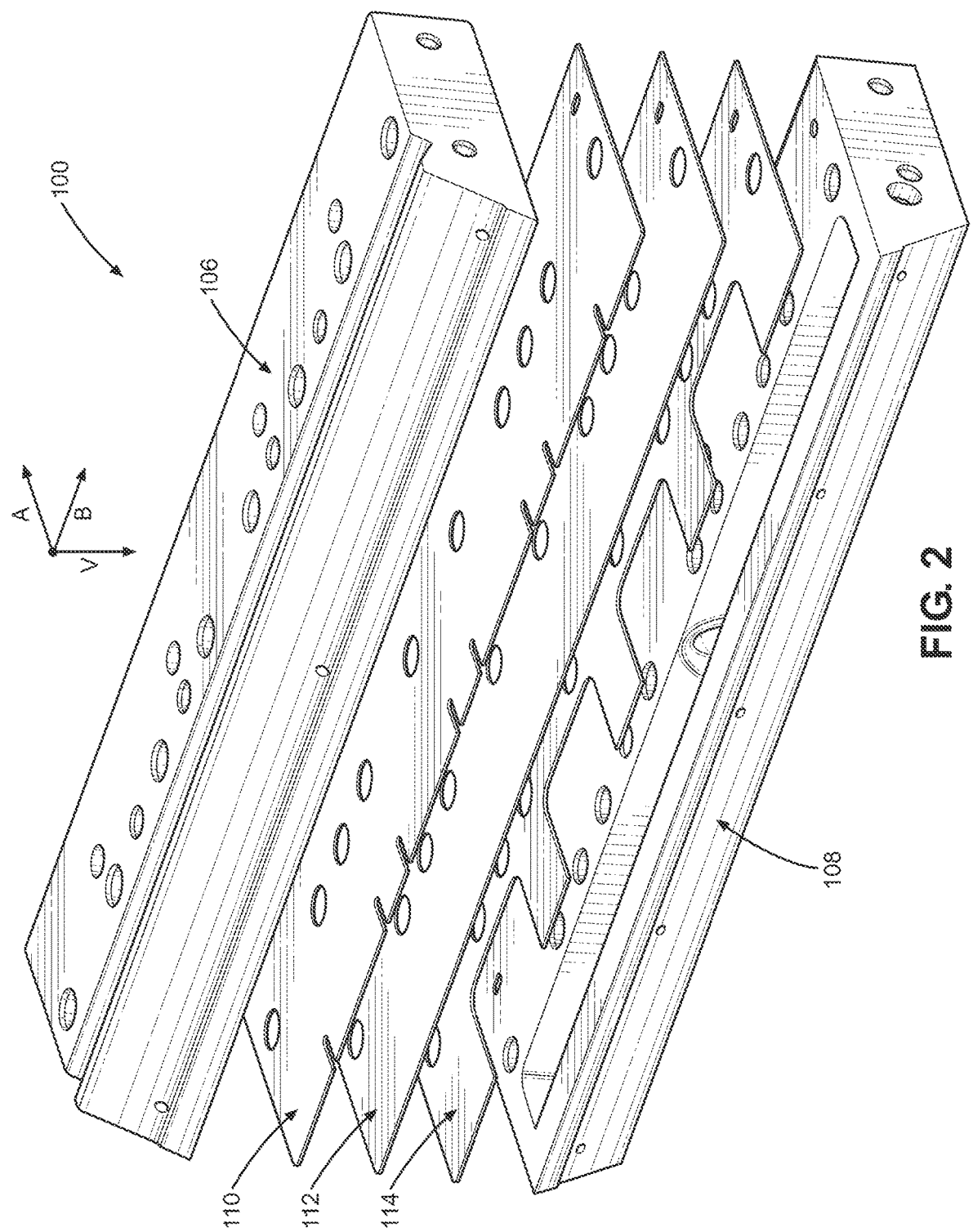
FIG. 2 illustrates a front perspective exploded view of the die shown in FIG. 1.

More particularly, FIGS. 1 and 2 provide front perspective view and an exploded front perspective view, respectively, of a multi-lane die 100. The multi-lane die 100 includes a dispensing end 102, a back end 104 spaced apart from the dispensing end in a first direction A, a right side 103, and a left side 105 spaced from the right side 103 in a second direction B. The first direction A may be referred to as an "axial" direction, and the second direction B may be referred to as a "transverse" direction. The dispensing end 102 is configured to apply a fluid coating to the substrate. The coating may include organic or inorganic solvents and water-based coating, dies, slurries, paint, hard coating, UV curable, adhesives, or still other fluids. Alternatively, the coating may be used without a solvent (e.g., be 100 percent solid). The multi-lane die 100 may be supported by a base, floor mount, table top, or other support structure (not shown) to align the die 100 with the substrate. In an aspect, the substrate may pass over a coating roll (not shown) positioned adjacent to the dispensing end 102 during an application of coating onto the substrate.

Certain terminology is used in the description for convenience only and is not limiting. The words "proximal" and "distal" generally refer to positions or directions toward and away from, respectively, an individual operating a cartridge assembly. The words "axial," "vertical," "transverse," "left," "right," "above," and "below" designate directions in the drawings to which reference is made. The term "substantially" is intended to mean considerable in extent or largely but not necessarily wholly that which is specified. The terminology includes the above-listed words, derivatives thereof and words of similar import.

The multi-lane die 100 includes an upper body member 106, a lower body member 108, an upper shim 110, a separator shim 112, and a lower shim 114. The upper shim 110, the separator shim 112, and the lower shim 114 may be referred to as a shim assembly. The die 100 may also include offset blocks, locking hinges, adapter fluid inlets, lip adjustments, or other components commonly used in dies. In some embodiments, the offset blocks can be offset surfaces that are not bolted to the die 100. The upper body member 106 and the lower body member 108 may preferably be manufactured from stainless steel. Alternatively, the upper body member 106 and the lower body member 108 may be manufactured from titanium, aluminum, special alloys, or other material having a high dimensional stability. It will be appreciated that the die 100 may include more body members, such as multiple center body members configured to provide coatings with three or more layers.

Figure 3A:
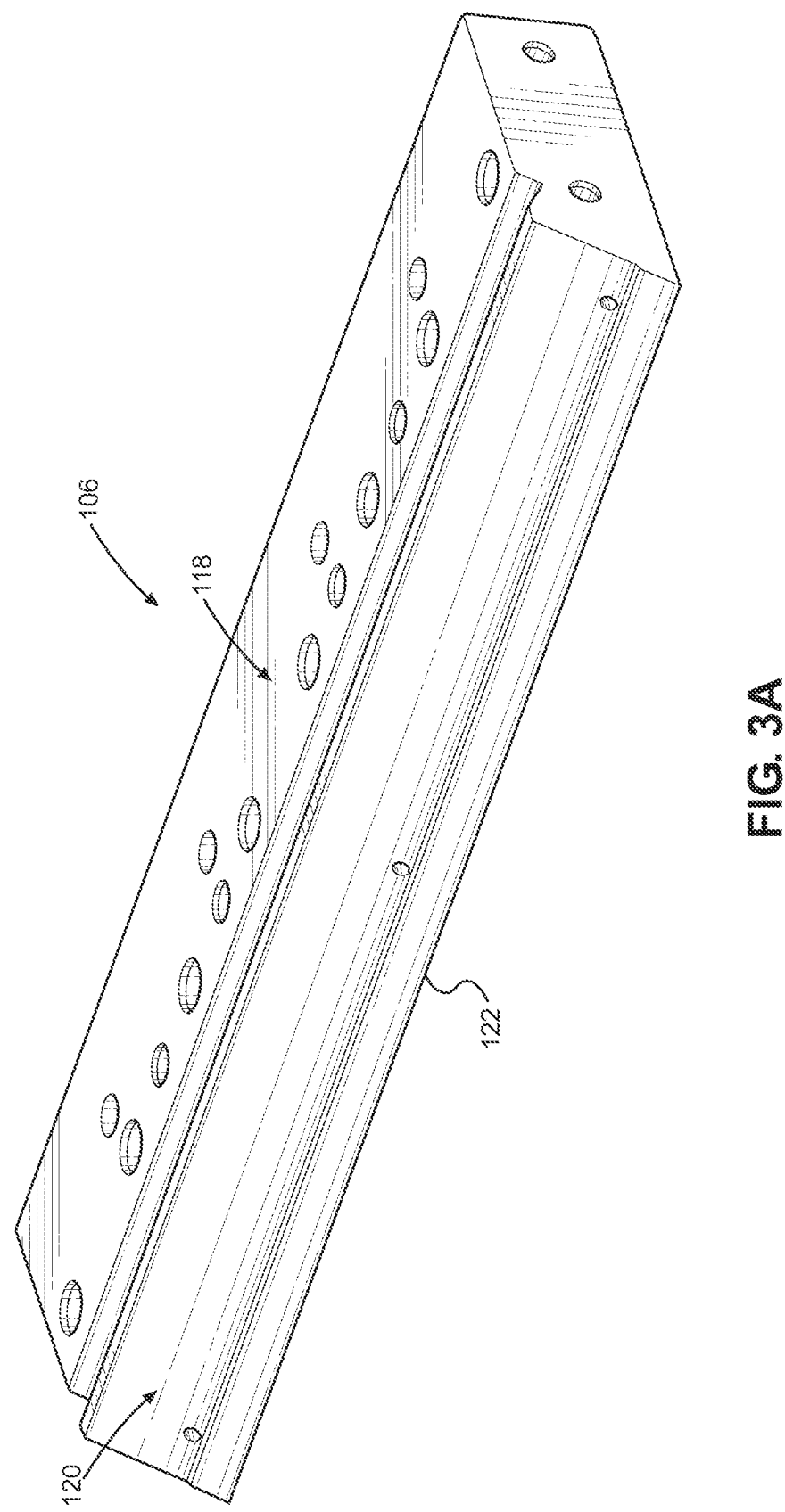
FIGS. 3A and 3B illustrate top perspective views of an upper body member of the die shown in FIG. 1.
Figure 3B:
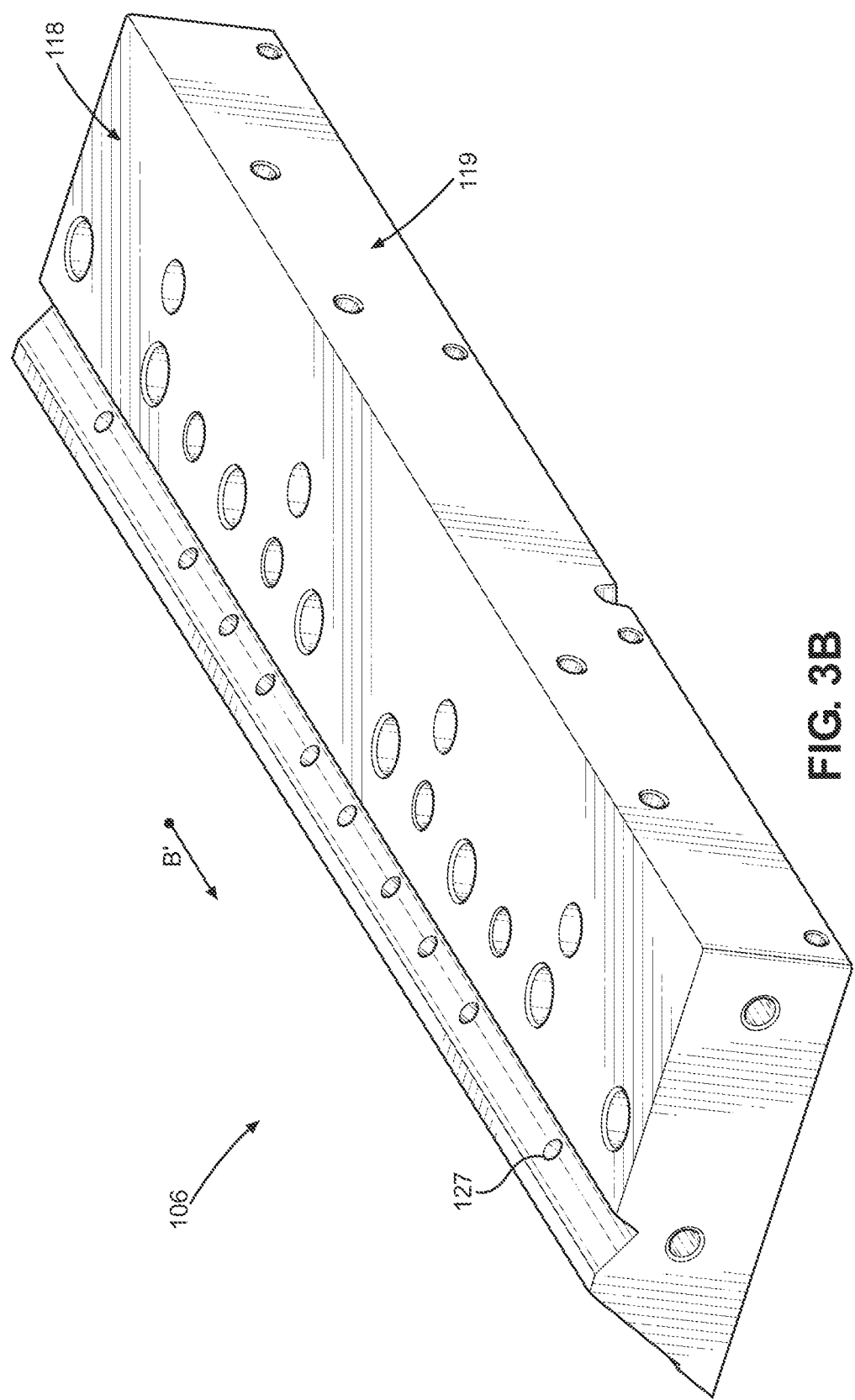
Figure 4:
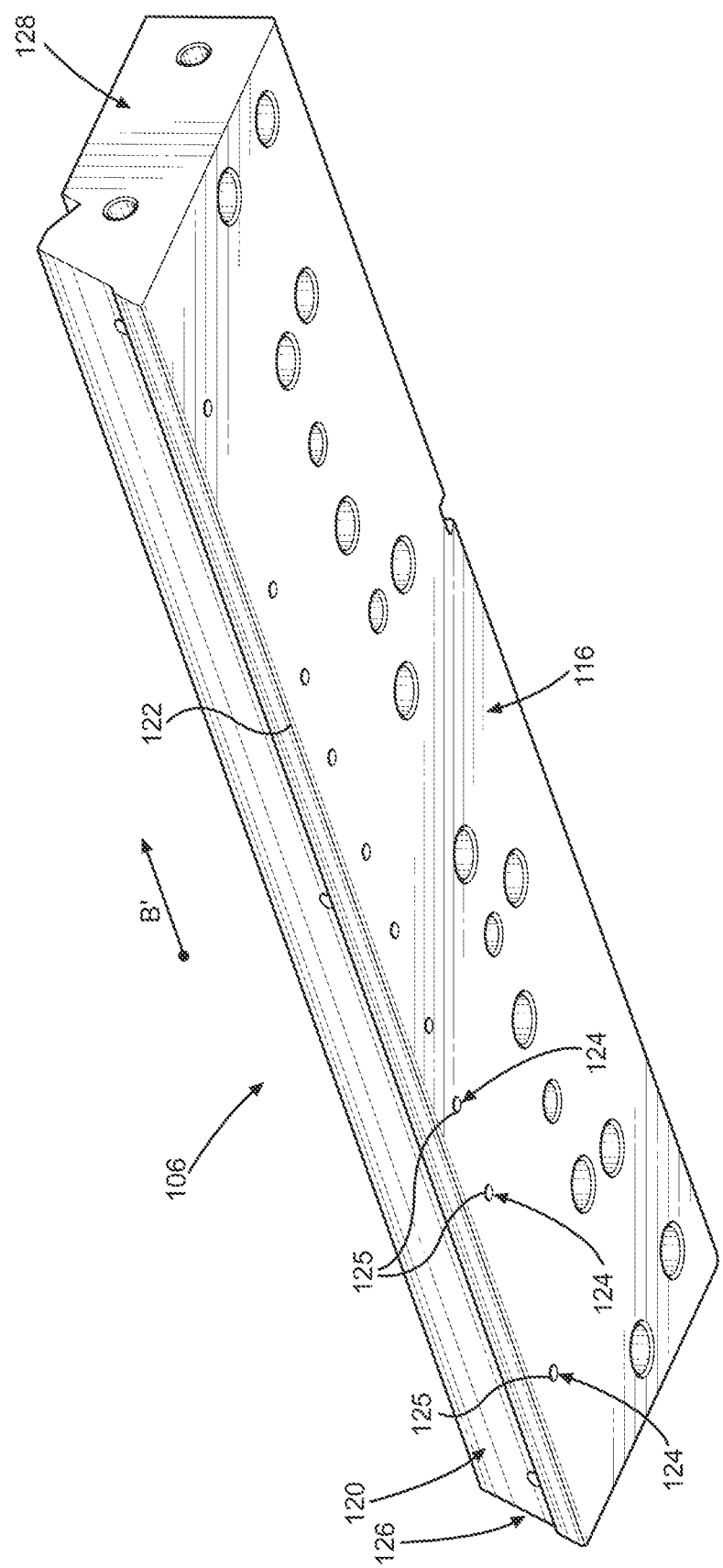
FIG. 4 illustrates a bottom perspective view of the upper body member of the die shown in FIG. 1.

FIGS. 3A, 3B, and 4 illustrate a first top perspective view, a second top perspective view, and a bottom perspective view of the upper body member 106, respectively. The upper body member 106 is positioned above the upper shim 110 in a vertical direction V (See FIG. 2). The upper body member 106 includes an upper inner surface 116, an upper exterior surface 118, an upper rear surface 119, and an upper front surface 120 opposing the upper rear surface 119. The upper rear surface 119 defines a portion of the back end 104 of the die 100, and an upper edge 122 of the upper front surface 120 defines a portion of the dispensing end 102. The upper edge 122 is adjacent to the upper inner surface 116. The upper inner surface 116 extends from the upper edge 122 of the upper front surface 120 to the upper rear surface 119, forming a substantially planar surface.

The upper body member 106 further includes at least one upper channel 124 that extends from a respective first at least one opening 125 defined by the upper inner surface 116 to a second at least one opening 127 (e.g. upper entrance port) defined by the upper exterior surface 118. Each of the at least one upper channels 124 is spaced along a transverse direction B' from a right end 126 to a left end 128 of the upper body member 106. In an aspect, each of the at least one upper channels 124 may be spaced substantially linearly along the transverse direction B'.

Figure 5:
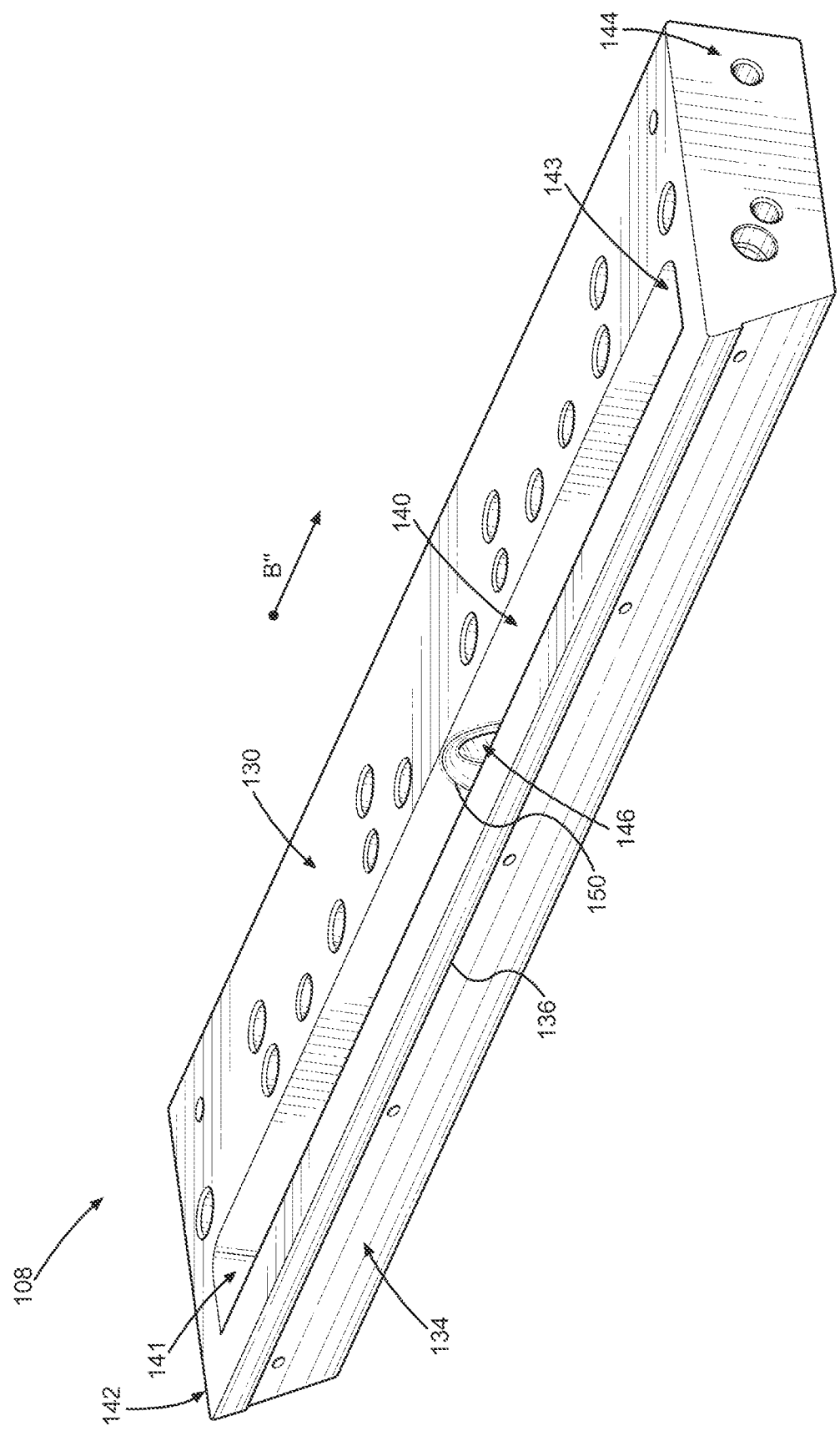
FIGS. 5 and 6 illustrate top perspective views of a lower body member of the die shown in FIG. 1.
Figure 6:
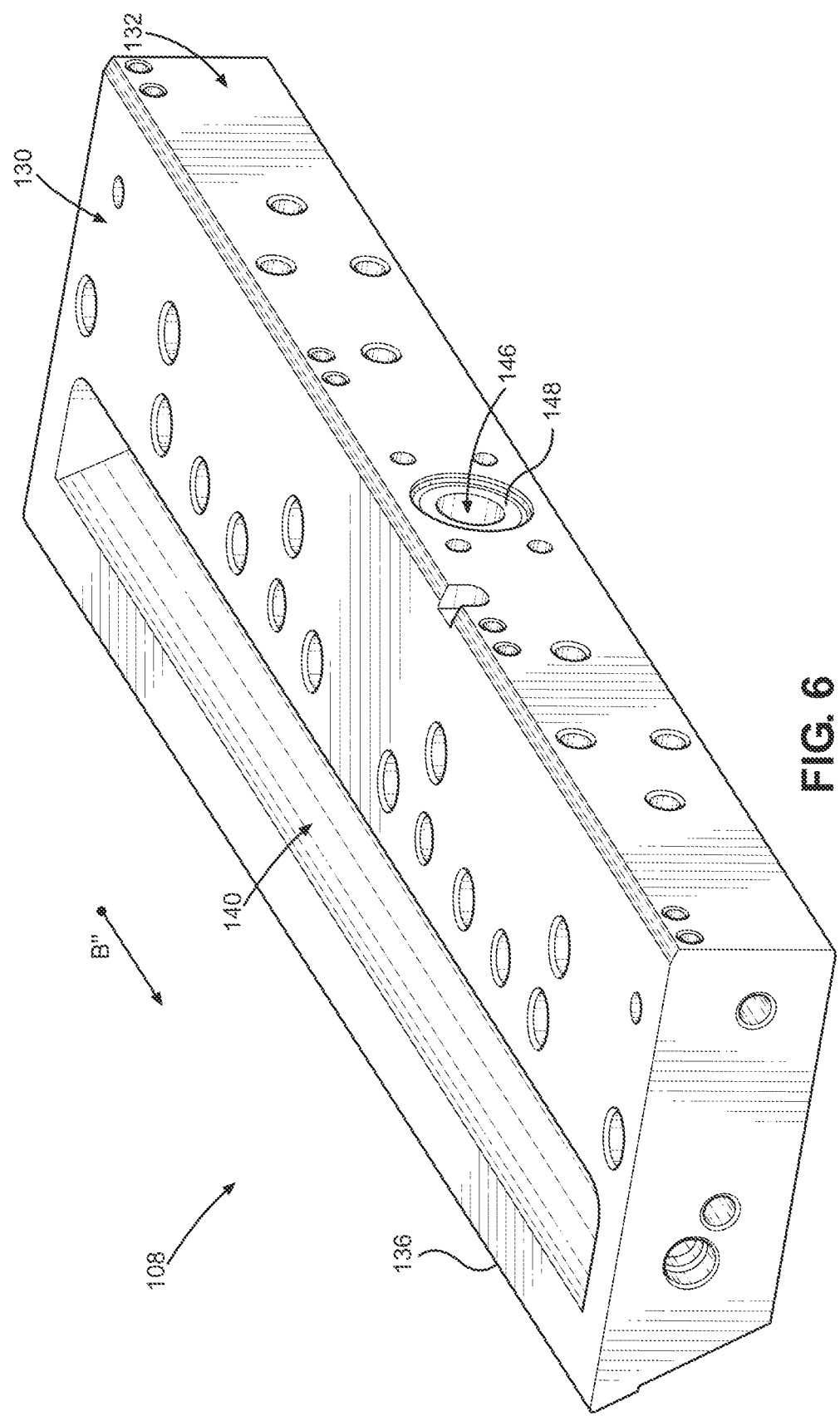

FIGS. 5 and 6 illustrate a top perspective view and a bottom perspective view of the lower body member 108, respectively. The lower body member 108 is positioned below the lower shim 114 in the vertical direction V (See FIG. 2). The lower body member 108 includes a lower inner surface 130, a lower exterior surface (not visible in figures), a lower rear surface 132, and a lower front surface 134 opposing the lower rear surface 132. The lower rear surface 132 defines a portion of the back end 104 of the die 100, and the lower front surface 134 defines a portion of the dispensing end 102. The lower inner surface 130 extends from the lower rear surface 132 to a lower edge 136 of the lower front surface 134, forming a substantially planar surface.

The lower inner surface 130 defines a cavity 140 that extends in a transverse direction B" from a first end 141 to a second end 143. The first end 141 is positioned towards a right end 142 of the lower body member 108, and the second end 143 is positioned towards a left end 144 of the lower body member 108. In an aspect, the first and second ends 141 and 143 of the cavity 140 are spaced from their respective right and left ends 142 and 144 of the lower body member 108 by a substantially equal distance, such that the cavity 140 is positioned in the middle of the lower body member 108 in the transverse direction B". The cavity 140 is formed within the lower body member 108, and is spaced between the lower edge 136 of the lower front surface 134 and the lower rear surface 132. The cavity 140 may also be referred to as a "distribution chamber" or "manifold."

The lower body member 108 defines a port channel 146 that extends through the lower body member 108 from a first port opening 148 to a second port opening 150. The first port opening 148 opens to the lower rear surface 132, and the second port opening 150 opens to the cavity 140. The port channel 146 may have a curvilinear shape along its length. In an aspect, a diameter of the first port opening 148 is substantially similar to a diameter of the second port opening 150. In another alternative aspect, the port channel 146 may have a substantially uniform diameter, such that an inner port surface (not labeled) that defines the port channel 146 is spaced equidistant along a length of the inner port surface from a center port line (not labeled) that extends through a center of the port channel 146 from the first port opening 148 to the second port opening 150.

The second port opening 150 opens at a center of the cavity 140 between the right end 142 and the left end 144 of the lower body member 108. In an alternative aspect, the second port opening 150 may open at a location different from the center of the cavity 140. In a further alternative aspect, the lower body member 108 may define more than one port channel 146, such that multiple port channels extend from the lower rear surface 132 to the cavity 140.

Referring to FIG. 1, the upper body member 106 may be aligned with the lower body member 108 in the axial direction A using offset blocks. At least one offset block may be positioned adjacent to both the upper rear surface 119 of the upper body member 106 and the lower rear surface 132 of the lower body member 108 in the axial direction A. A contact surface of the at least one offset block is substantially parallel to the upper rear surface 119 and the lower rear surface 132.

Figure 7:
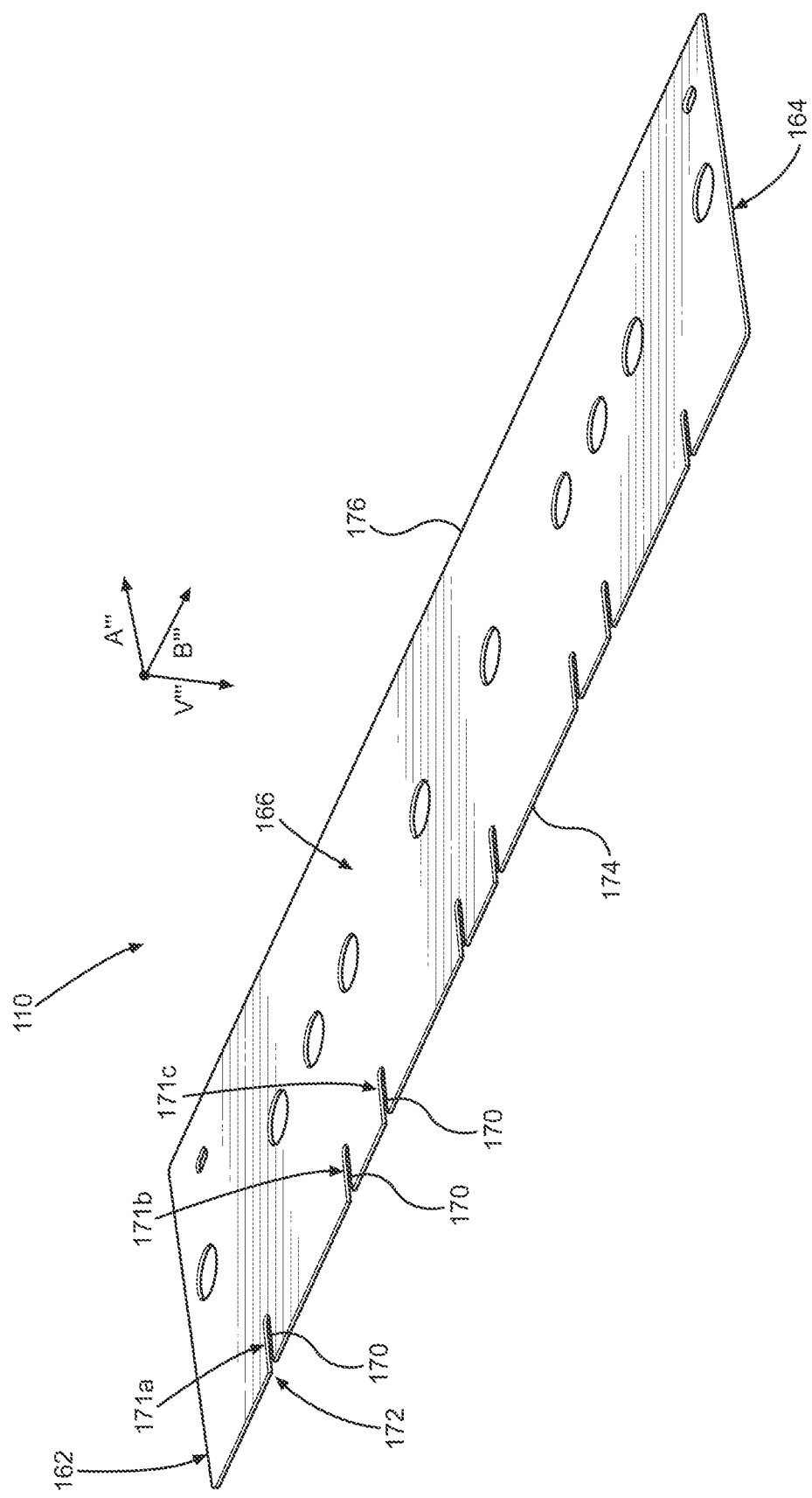
FIG. 7 illustrates a perspective view of an upper shim, according to an aspect of this disclosure.

FIG. 7 illustrates a perspective view of the upper shim 110. The upper shim 110 extends in a transverse direction B''' from a right end 162 to a left end 164. The upper shim 110 is positioned below the upper body member 106 and above the separator shim 112. The upper shim 110 includes an upper surface 166 and an opposing lower surface (not visible in figures). The upper surface 166 is adjacent to the upper inner surface 116 of the upper body member 106. In an aspect, the upper surface 166 is substantially flush against the upper inner surface 116. The upper shim 110 further includes at least one inner edge 170. Each of the at least one inner edges 170 defines a first at least one opening 171 that extends through the upper shim 110 in a vertical direction V''' and at least one opening 172 that opens to a front edge 174 of the upper shim 110. The front edge 174 extends from the right end 162 to the left end 164 of the upper shim 110. Each of the at least one openings 171 further extend from a respective at least one opening 172 towards a back edge 176 of the upper shim 110 at least partially in an axial direction A'''. Each at least one opening 171 may extend linearly, curvilinearly, angularly offset, combinations thereof or still in other orientations. For example, the openings 171a and 171c have an angled, curvilinear, or otherwise non-linear orientation. In contrast, the opening 171b has a linear orientation and extends substantially straight in the axial direction A'''. It will be appreciated that the each of the at least on openings 171 may have the same orientation as each of the other at least one openings 171, or the openings 171 may comprise a combination of various orientations.

Each of the at least one openings 171 is positioned adjacent to a respective at least one opening 125 defined by the upper body member 106, such that each of the at least one upper channels 124 is in fluid communication with each respective at least one opening 171.

Figure 8:
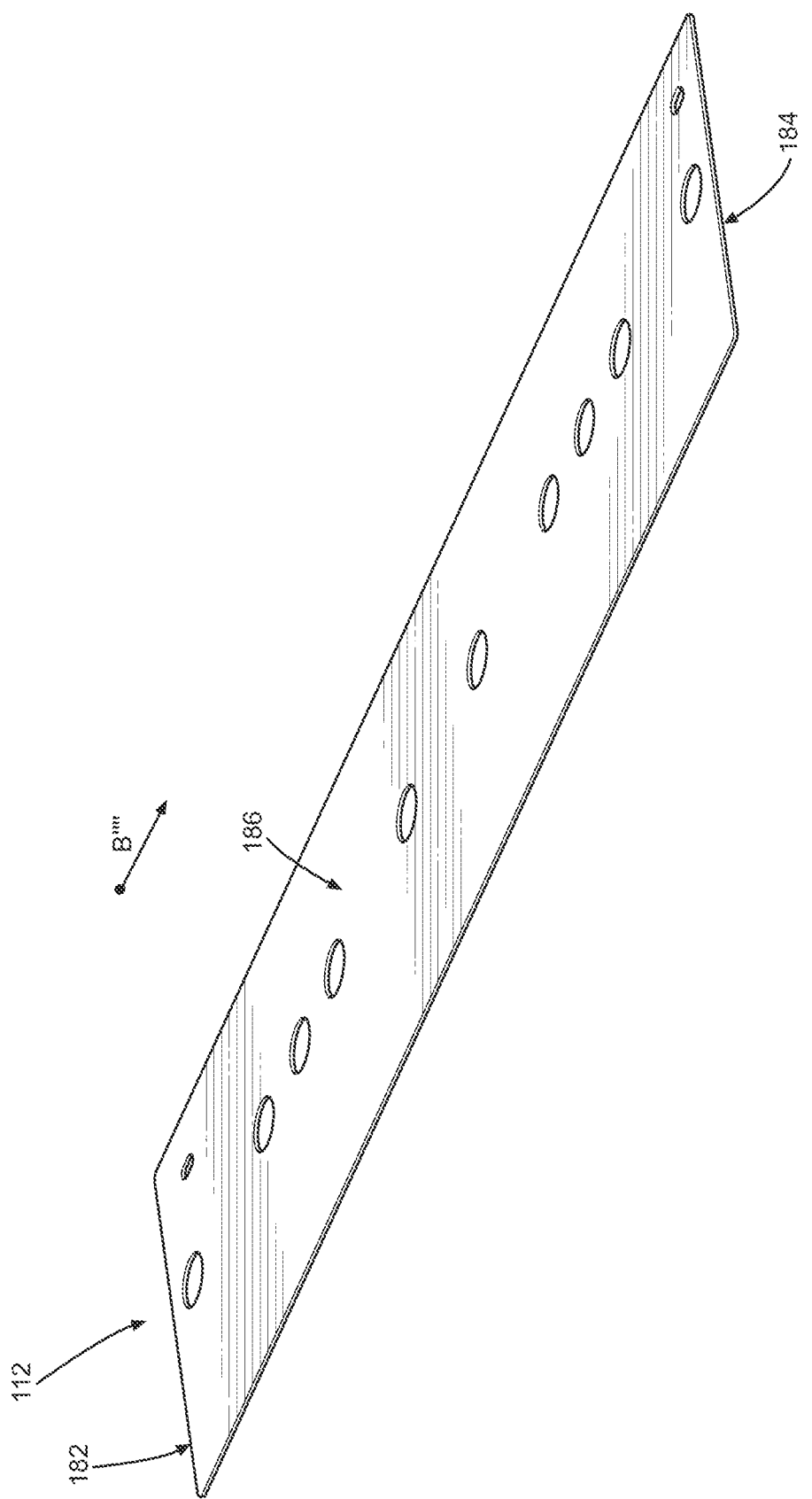
FIG. 8 illustrates a perspective view of a separator shim, according to an aspect of this disclosure.

FIG. 8 illustrates a perspective view of the separator shim 112. The separator shim 112 extends in a transverse direction B'''' from a right end 182 to a left end 184. The separator shim 112 is positioned below the upper shim 110 and above the lower shim 114. The separator shim 112 includes an upper surface 186 and an opposing lower surface (not visible in figures). The upper surface 186 is adjacent to the lower surface of the upper shim 110. In an aspect, the upper surface 186 is substantially flush against the lower surface of the upper shim 110.

Figure 9:
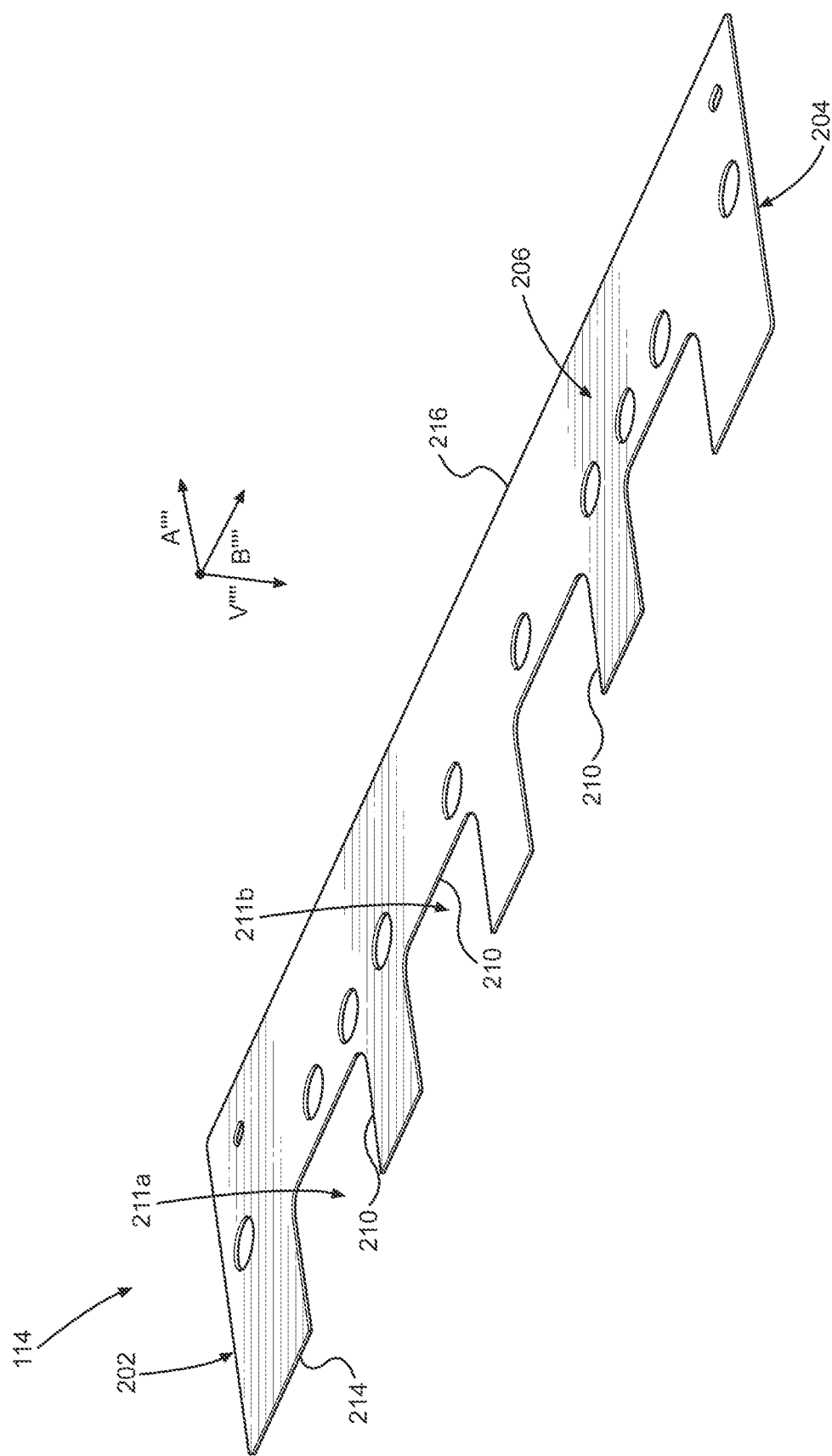
FIG. 9 illustrates a perspective view of a lower shim, according to an aspect of this disclosure.

FIG. 9 illustrates perspective view of the lower shim 114. The lower shim 114 extends in a transverse direction B''''' from a right end 202 to a left end 204. The lower shim 114 is positioned below the separator shim 112 and above the lower body member 108. The lower shim 114 includes an upper surface 206 and an opposing lower surface (not visible in figures). The upper surface 206 is adjacent to the lower surface of the separator shim 112. In an aspect, the upper surface 206 of the lower shim 114 is substantially flush against the lower surface of the separator shim 112. The lower shim 114 further includes at least one inner edge 210. Each of the at least one inner edges 210 defines a first at least one opening 211 that extends through the lower shim 114 in a vertical direction V''''' and at least one opening that opens to a front edge 214 of the lower shim 114. The front edge 214 extends from the right end 202 to the left end 204 of the lower shim 114. Each of the at least one openings 211 further extends from a respective at least one opening towards a back edge 216 of the lower shim 114 at least partially in an axial direction A'''''. The openings 211 may comprise rectangular configurations, semi-circular configurations, rounded rectangular configurations, combinations thereof or still in other configurations. For example, as illustrated in FIG. 9, the openings 211 comprise four (4) openings that have rounded rectangular configurations. It will be appreciated that the each of the at least on openings 211 may have the same configuration as each of the other at least one openings 211, or the openings 211 may comprise a combination of various configurations. In an aspect, each of the at least one openings 211 is spaced from each adjacent opening 211 by substantially the same distance.

The right ends and the left ends of each of the upper body member 106, lower body member 108, the upper shim 110, separator shim 112, and lower shim 114 are positioned to align with the right side 103 and the left side 105 of the die 100, respectively. The upper shim 110 may have a uniform thickness T, such that the upper surface 166 of the upper shim 110 is substantially parallel to the lower surface of the upper shim 110. The upper surface 166 and the lower surface of the upper shim 110 are positioned to contact the upper inner surface 116 of the upper body member 106 and the upper surface 186 of the separator shim 112, respectively. The upper shim 110 defines a first spacing between the upper body member 106 and the separator shim 112. Similarly, the upper surface 206 and lower surface of the lower shim 114 are positioned to contact the lower surface of the separator shim 112 and the inner surface 130 of the lower body member 108, respectively. The lower shim 114 defines a second spacing between the separator shim 112 and the lower body member 108. Each of the upper and lower shims 110 and 114 may have a different uniform thickness T, whereby a size of the first spacing is different from a size of the second spacing. For example, the upper shim 110 positioned between the upper body member 106 and the separator shim 112 may have a thickness T of 0.020 inches, and the lower shim 114 positioned between the separator shim 112 and the lower body member 108 may have a thickness T of 0.010 inches. The thickness T of the upper shim 110 defines the size of the first spacing to be 0.020 inches, and the thickness T of the lower shim 114 defines the size of the second spacing to be 0.010 inches. In a preferred aspect, the thickness T of each of the upper shim 110 and the lower shim 114 are substantially similar.

Figure 10:
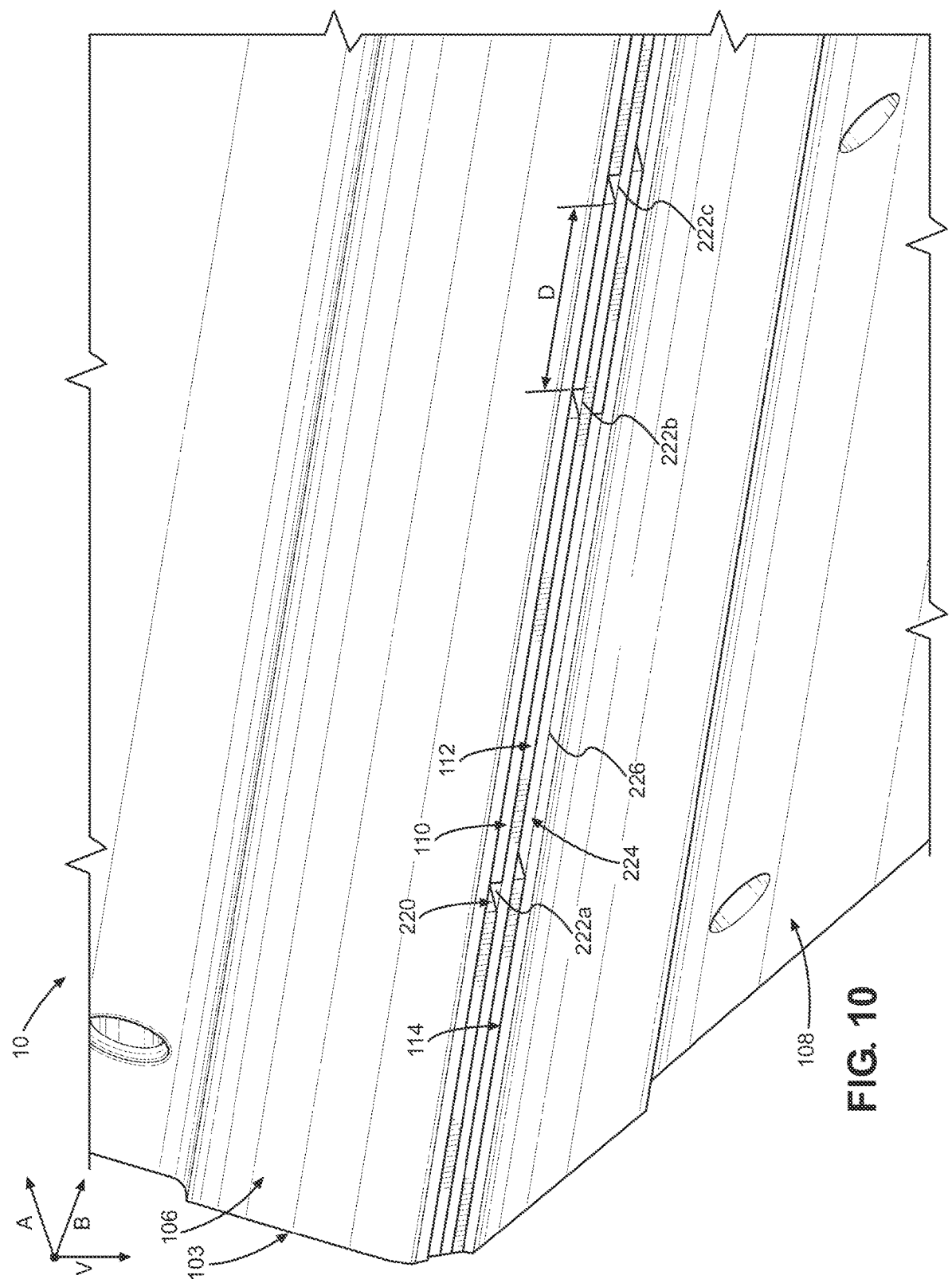
FIG. 10 illustrates a portion of a perspective view of the die shown in FIG. 1.

FIG. 10 illustrates a perspective view of a portion of the die 100. The portion of the die 100 illustrated in FIG. 10 represents the rectangular portion identified by numeric identifier "10" in FIG. 1. A first at least one dispensing channel 220 is defined by the upper surface 186 of the separator shim 112, the at least one inner edge 170 of the upper shim 110, and the upper inner surface 116 of the upper body member 106. The first at least one dispensing channel 220 extends from a first at least one dispense opening 222 to the at least one upper channel 124 defined by the upper body member 106, such that the second at least one opening 127 defined by the upper exterior surface 118 of the upper body member 106 is in fluid communication with the first at least one dispense opening 222.

The configuration of the at least one opening 171 of the upper shim 110 may depend upon the spacing of the at least one upper channel 124 of the upper body member 106 along the transverse direction B'. For example, if a first opening 171a is positioned directly below a respective upper channel 124 in the vertical direction V, the at least one opening 171 may extend linearly. If the first opening 171a is not positioned directly below a respective upper channel 124 in the vertical direction V, the at least one opening may extend, for example, non-linearly, such that the first at least one dispensing channel 220 is in fluid communication with the at least one upper channel 124. The various configurations of the at least one opening 171 enable a user to modify a location of the first at least one dispense opening 222 along the transverse direction B of the die 100. Therefore, if a lane being discharged from the die 100 needs to be modified along the transverse direction B, the upper shim 110 may be modified or replaced, as opposed to replacing other larger components, such as the upper body member 106.

A second at least one dispensing channel 224 is defined by the lower surface of the separator shim 112, the at least one inner edge 210 of the lower shim 114, and the lower inner surface 130 of the lower body member 108. The second at least one dispensing channel 224 extends from a second at least one dispense opening 226 to the cavity 140 defined by the lower body member 108, such that the first port opening 148 defined by the lower rear surface 132 of the lower body member 108 is in fluid communication with the second at least one dispense opening 226. The first at least one dispensing channel 220 and second at least one dispensing channel 224 may be referred to as an "upper slot gap" and a "lower slot gap," respectively. The upper edge 122 of the upper front surface 120, the lower edge 136 of the lower front surface 134, the first at least one dispense opening 222, and the second at least one dispense opening 226 define a portion of the dispensing end 102 of the die 100, referred to as a "lip face."

Each of the first at least one dispense openings 222 is spaced along the dispensing end 102 of the die 100 in the transverse direction B. Each of the second at least one dispense openings 226 is spaced along the dispensing end 102 in the transverse direction B, such that each second at least one dispense opening 226 is positioned between a pair of first at least one dispense openings 222 in the transverse direction B. For example, a first dispense opening 222a is positioned on a right side of the one of the second dispense openings 226, and another first dispense opening 222b is positioned on a left side of the second dispense opening 226. In an aspect, a leftmost side of the first dispense opening 222a aligns with a rightmost side of a respective second dispense opening 226 in the transverse direction B, and a rightmost side of the first dispense opening 222b aligns with a leftmost side of a respective second dispense opening 226 in the transverse direction B.

A method for using the die 100 for dispensing a first fluid through the first at least one dispense opening 222 and a second fluid through the second at least one dispense opening 226 commences by aligning the upper body member 106, the upper shim 110, the separator shim 112, the lower shim 114, and the lower body member 108. The upper body member 106 is raised above the lower body member 108 in the vertical direction V and the lower shim 114 is placed on top of the lower inner surface 130 of the lower body member 108, the separator shim 112 is placed on top of the upper surface 206 of the lower shim 114, and the upper shim 110 is placed on top of the upper surface 186 of the separator shim 112.

The upper body member 106 is lowered onto the upper shim 110 until the upper inner surface 116 of the upper body member 106 is in contact with the upper surface 166 of the upper shim 110. The thickness T of each shim 110 and 114 may be selected based on a desired amount of a first and a second fluid to dispense. The body members 106 and 108 and each of the shims 110, 112, and 114 are aligned, such that the first at least one dispensing channel 220 and the second at least one dispensing channel 224 are formed.

Offset blocks may be coupled to the upper rear surface 119 of the upper body member 106 and the lower rear surface 132 of the lower body member 108. One or more uniform operating pumps (not shown) may be coupled to the first port opening 148 of the lower body member 108, and one or more uniform operating pumps may be coupled to the second at least one opening 127 of the upper body member 106. The uniform operating pumps may be configured to deliver an exact volume of a first and a second fluid through the die 100 to the at least one first and second dispense openings 222 and 226 to maintain a desired wet film thickness on the receiving element being coated. It will be appreciated that the uniform operating pump may be configured to operate at a variety of speeds, apply a variety of different coating thicknesses, and use a variety of different coating fluids.

Figure 11:
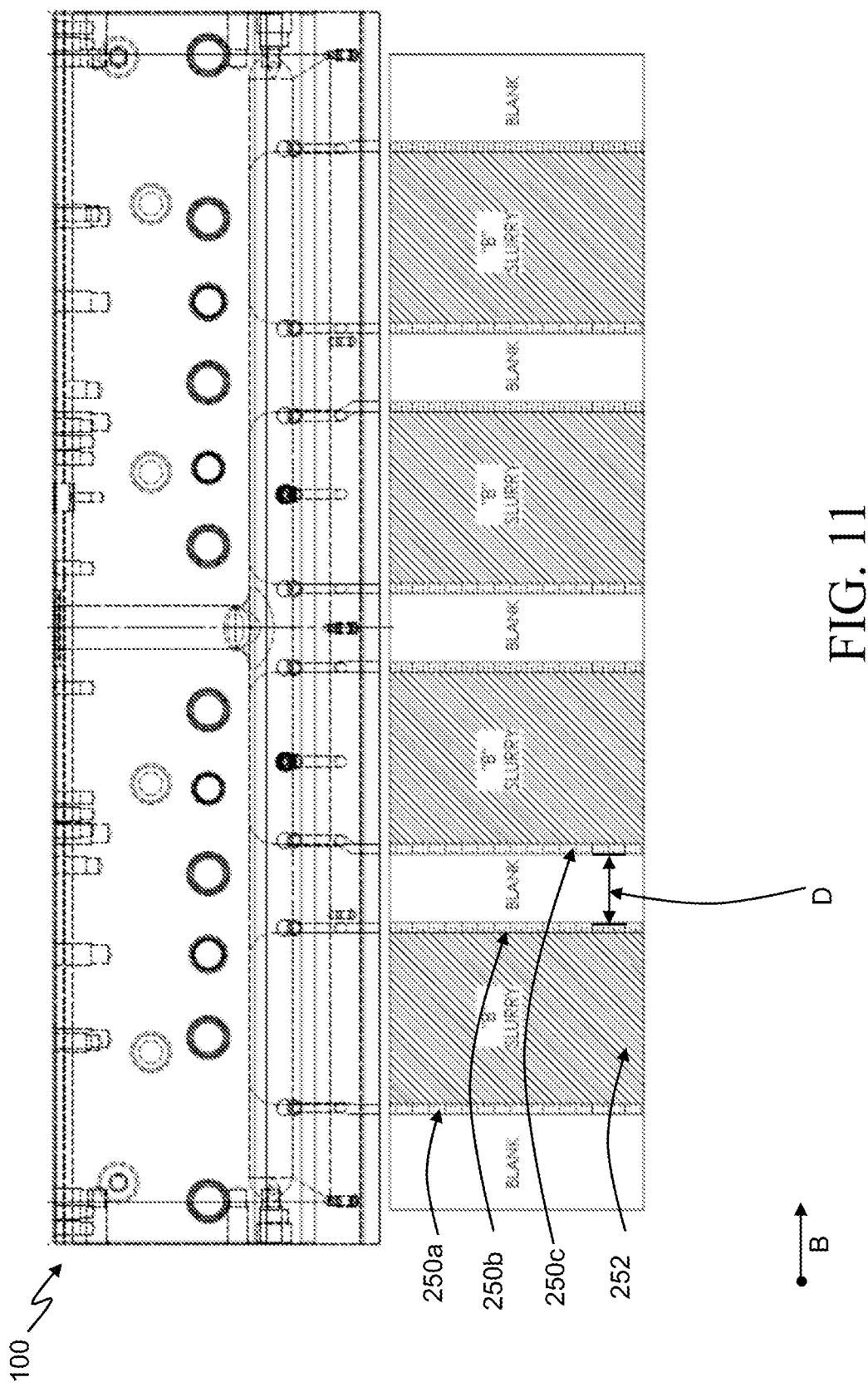
FIG. 11 illustrates an output from the die shown in FIG. 1.

The positioning of the at least one first and second dispense openings 222 and 226 along the dispensing end 102 allows for at least one coating 250 to be formed on a receiving element. FIG. 11 illustrates coatings output by the die 100. Each of the coatings 250 include multiple lanes of fluid. For example, a coating 250a is dispensed through the first dispense opening 222a, a coating 250b is dispensed through the first dispense opening 222b, and a coating 250c is dispensed through the first dispense opening 222c. The one or more operating pumps coupled to the second at least one opening 127 provide the first fluid to the first dispense openings 222, and the one or more operating pumps coupled to the first port opening 148 provide the second fluid to each of the second at least one dispense openings 226. A coating 252 is dispensed through the at least one dispense opening 226. The at least one coating 252 is formed on the receiving element that comprises a lane of the second fluid positioned between two lanes 250 of the first fluid. Each coating formed on the receiving element may include substantially the same fluid lanes as each other coating, and may be spaced from each adjacent coating by a distance D. The distance D is a distance between, for example, a leftmost end of the first dispense opening 222b and a rightmost end of an adjacent first dispense opening 222c. It will be appreciated that each coating may be sized and spaced along the transverse direction B based on the size and spacing of the at least one first and second dispense openings 222 and 226.

To change the size, the spacing, and the number of coatings and lanes discharged from the die 100, the upper shim 110 and the lower shim 114 may be removed and replaced with alternate upper and lower shims. For example, as illustrated in FIGS. 1 through 10, the die 100 is configured to produce four (4) coatings. Each of the four coatings includes a lane of the second fluid positioned between a pair of lanes of the first fluid. Each of the four coatings is spaced apart from each other adjacent coating by the distance D. If fewer coatings (e.g. two coatings) are desired, a new lower shim having two (2) openings 211 that extend through the new lower shim may replace the lower shim 114. A new upper shim having four (4) openings 171 that extend through the new upper shim may replace the upper shim 110. The new lower shim and the new upper shim form two (2) second dispense openings 226 and four (4) first dispense openings 222, respectively. Two of the four first dispense openings 222 may be positioned adjacent to a right end and a left end of one of the two second dispense openings 226 (e.g. one dispense opening 222 adjacent to the right end of one of the two dispense openings 226 and one dispense opening 222 adjacent to the left end of the one of the two second dispense openings 226), and the other two of the four first dispense openings 222 may be positioned adjacent to a right end and a left end of the other of the two second dispense openings 226. The new lower shim and the new upper shim may produce two (2) coatings each having a lane of the second fluid positioned between two (2) lanes of the first fluid.

Similarly, to change the spacing between the coatings discharged from the die 100, the upper shim 110 and the lower shim 114 may be removed and replaced with alternate upper and lower shims. For example, if a large distance D between adjacent coatings is desired, a new lower shim having openings 211 spaced farther apart along the transverse direction B may replace the lower shim 114. Correspondingly, a new upper shim having openings 171 spaced farther apart may replace the upper shim 110.

The orientation of each of the first at least one openings 171 of the upper shim 110 is dependent upon the desired size and spacing of the at least one dispense opening 222. For example, if it is desired to have a lane of the first fluid positioned substantially close to the right side 103 of the die 100, and a rightmost at least one upper channel 124 is positioned to the left of the desired position of the lane of the first fluid, a new upper shim with a first opening 171 having a curvilinear or angled shape may replace the upper shim 110. The curvilinear or angled shape of the first opening 171 may fluidly connect the at least one upper channel 124 to a first dispense opening 222 positioned at the desired location of the lane. A benefit of modifying the location of the lanes by replacing the upper and/or lower shims 110 and 114 is that replacement of the upper body member 106 and/or the lower body member 108 is not required in order to change the locations of the at least one first and second dispense openings 222 and 226.

When the thickness of either the first or second fluid needs to be adjusted to a new desired thickness, for example, for coating a new or different substrate, the upper and lower shims 110 and 114 may be removed and replaced with new shims that define the new desired thickness. A benefit of the die 100 is that after a new shim is positioned within the die 100, the at least one first and second dispense openings 222 and 226 remain extended along a plane that is substantially parallel to the vertical direction V. This minimizes operator time to align, adjust, or orient the die 100 with the receiving element.

Figure 12:
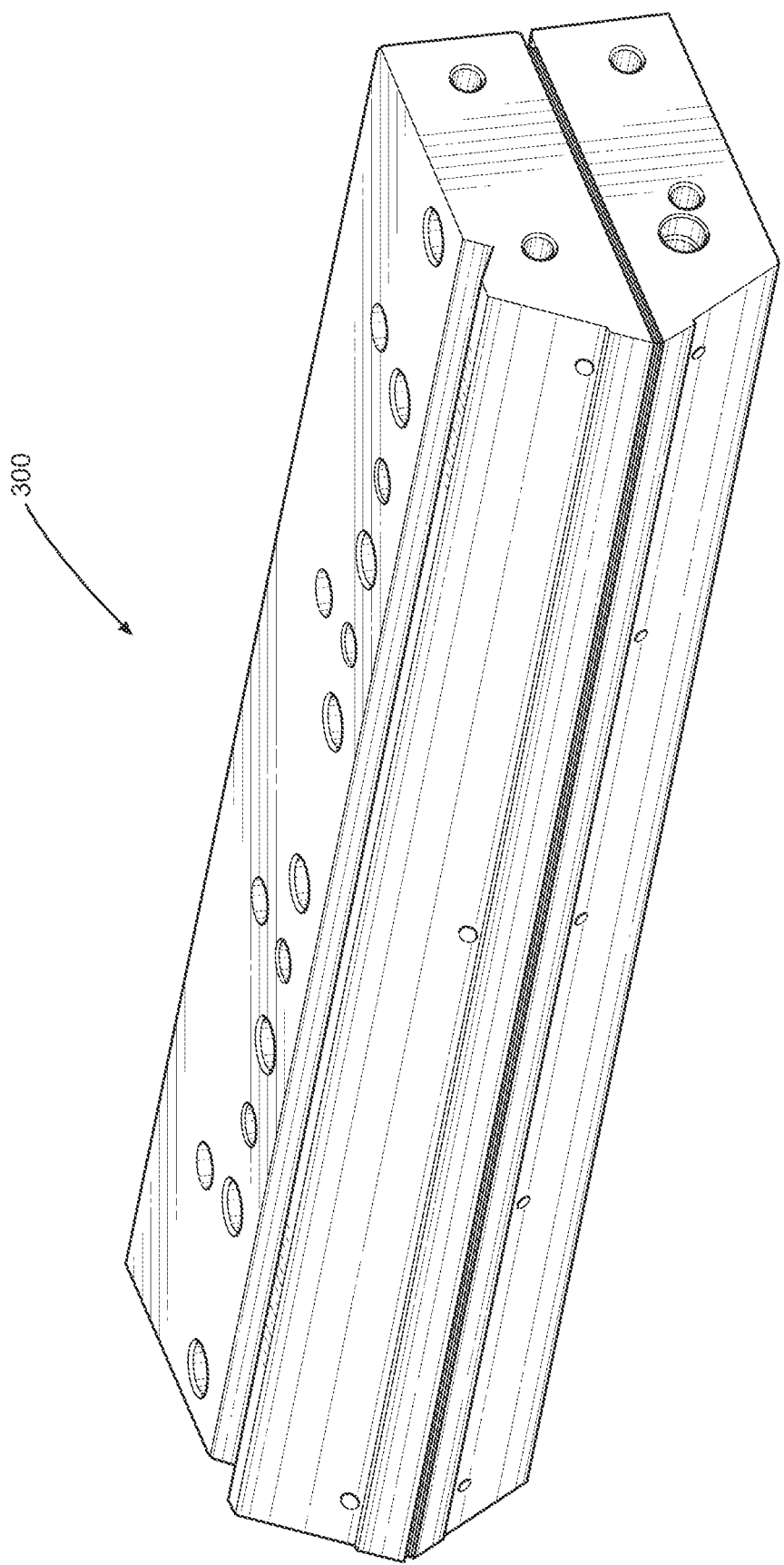
FIGS. 12 and 13 illustrate a front perspective view and an exploded view of an alternative embodiment of a die, according to another aspect of this disclosure.
Figure 13:
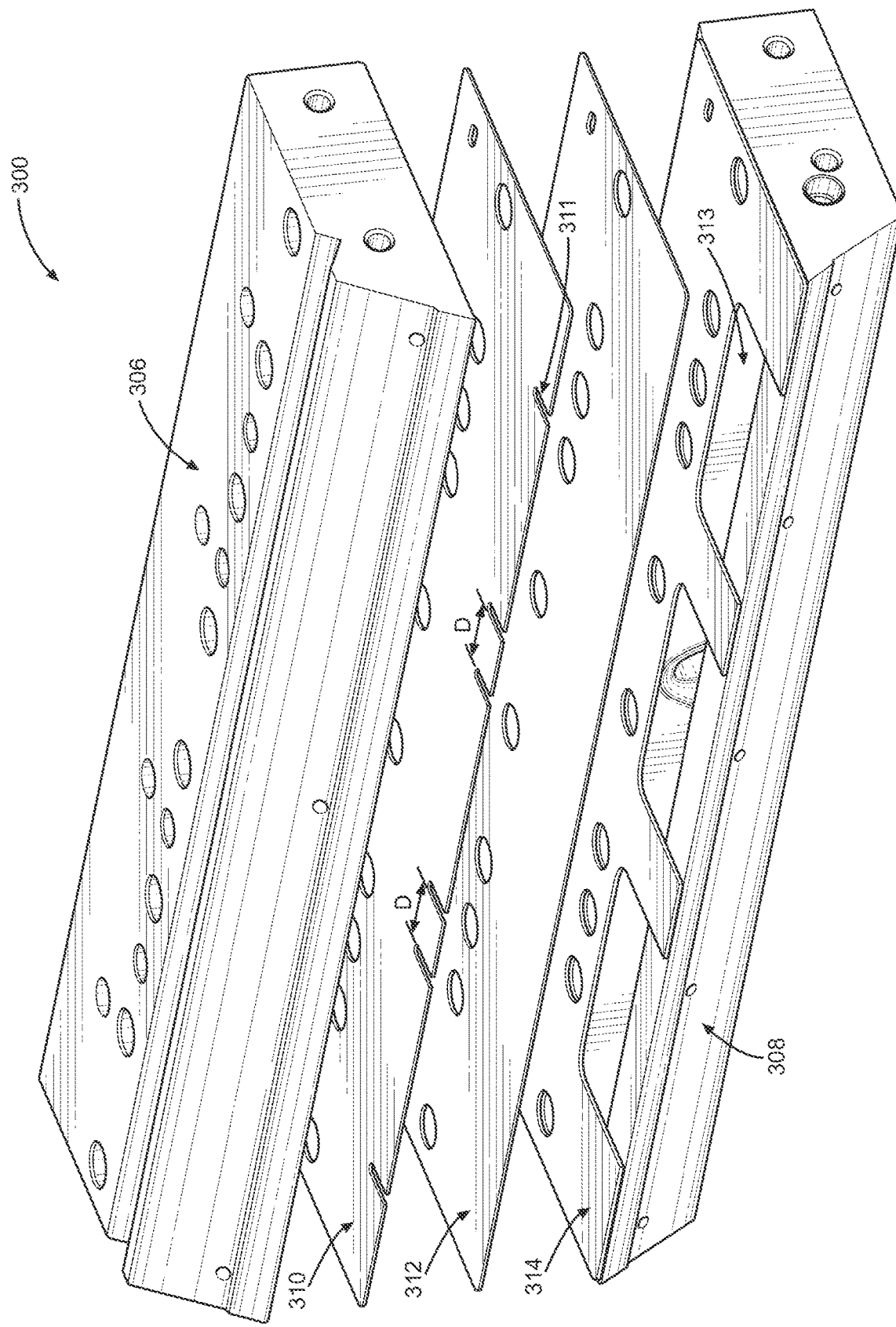

FIGS. 12 and 13 illustrate a front perspective view and an exploded front perspective view of a die 300, according to an aspect of this disclosure. The die 300 includes an upper body member 306, a lower body member 308, an upper shim 310, a separator shim 312, and a lower shim 314. Portions of the upper body member 306, the lower body member 308, the upper shim 310, the separator shim 312, and the lower shim 314 include similar features and configurations as the upper body member 106, the lower body member 108, the upper shim 110, the separator shim 112, and the lower shim 114, respectively, of the die 100 described above.

Although reference was made to the die 100 in the above described example for using the die 100, similar methods may also be employed by the die 300.

Figure 14:
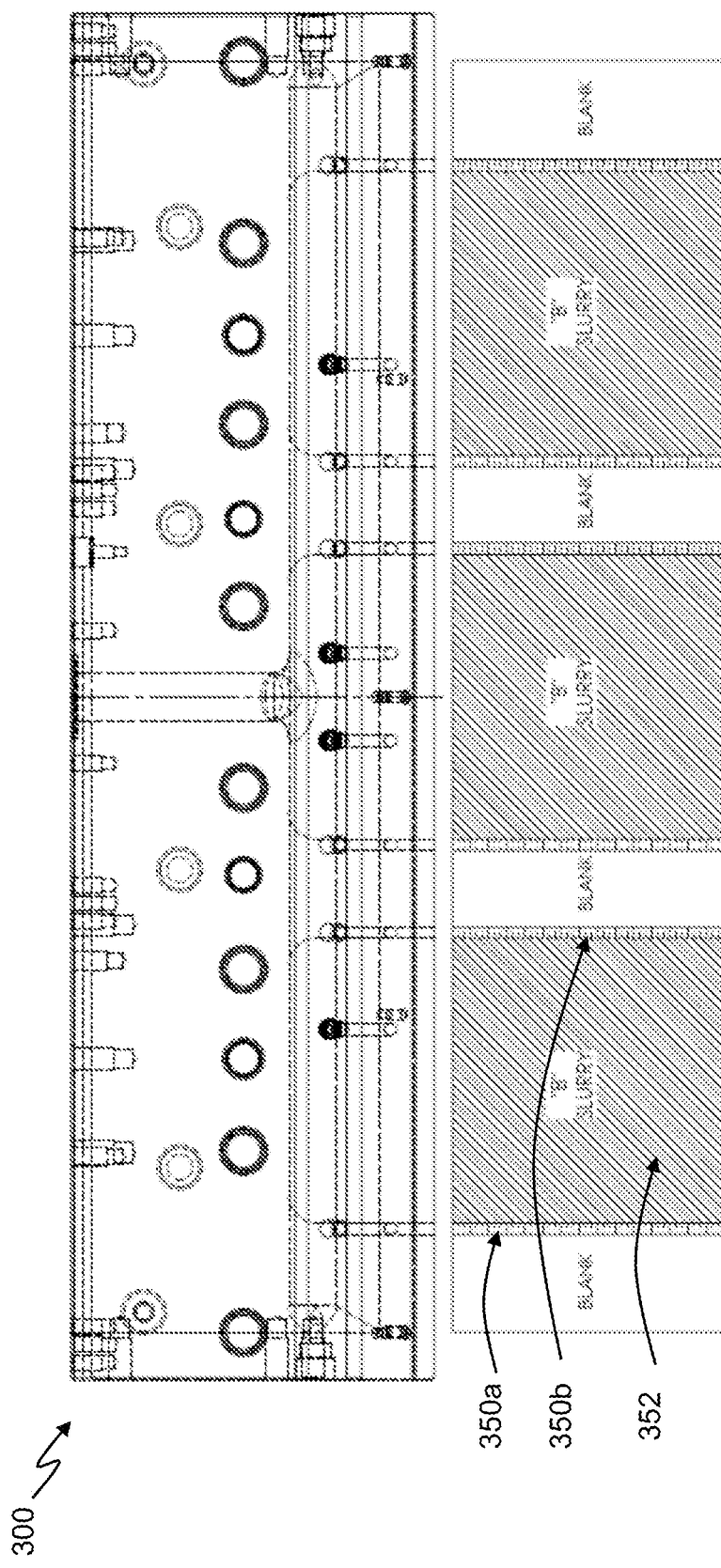
FIG. 14 illustrates an output from the die illustrated in FIG. 12.

Die 300 illustrates alternate configurations for an upper shim and a lower shim. For example, the upper shim 310 comprises six (6) openings 311, and the lower shim 314 comprises three (3) openings 313. The configuration of the die 300 produces three (3) coatings spaced apart by a distance D'. Each of the coatings include a lane 352 of a first substance discharged through a channel formed by the openings 313, and two (2) lanes 350 of a second substance on the right and left sides of the first substance formed by the openings 311. FIG. 14 illustrates an output of each of the coatings from the die 300.

In an alternative aspect, the upper body member 306 may include a manifold, such that the die 300 is a multi-manifold die. The manifold of the upper body member 306 is in fluid communication with the openings 311 of the upper shim 310.

These specific embodiments described above are for illustrative purposes and are not intended to limit the scope of the disclosure as otherwise described and claimed herein. Modification and variations from the described embodiments exist. The scope of the invention is defined by the appended claims.

What is claimed is:

1. A die having a plurality of dispense openings, the die comprising:
    an upper body member having an upper inner surface, an upper exterior surface, and at least one upper channel extending from the upper inner surface to the upper exterior surface;
    an upper shim positioned adjacent to the upper inner surface, the upper shim defining a first opening, a second opening spaced from the first opening by a first distance, a fourth opening spaced from the second opening by a second distance, and a fifth opening spaced from the fourth opening by the first distance, the first distance being different from the second distance;
    a separator shim positioned adjacent to the upper shim, the separator shim having an upper surface and a lower surface,
    wherein the upper surface of the separator shim, the first opening of the upper shim, and the upper inner surface of the upper body member define a first dispensing channel, the first dispensing channel terminating in a first dispense opening, wherein the upper surface of the separator shim, the second opening of the upper shim, and the upper inner surface of the upper body member define a second dispensing channel, the second dispensing channel terminating in a second dispense opening, wherein the upper surface of the separator shim, the fourth opening of the upper shim, and the upper inner surface of the upper body member define a fourth dispensing channel, the fourth dispensing channel terminating in a fourth dispense opening, and wherein the upper surface of the separator shim, the fifth opening of the upper shim, and the upper inner surface of the upper body member define a fifth dispensing channel, the fifth dispensing channel terminating in a fifth dispense opening;

a lower shim positioned adjacent to the lower surface of the separator shim, the lower shim defining a third opening and sixth opening spaced from the third opening; and a lower body member having a lower inner surface, a lower exterior surface, and at least one lower channel extending from the lower inner surface to the lower exterior surface, wherein the lower surface of the separator shim, the third opening of the lower shim, and the lower inner surface of the lower body member define a third dispensing channel terminating in a third dispense opening, and wherein the lower surface of the separator shim, the sixth opening of the lower shim, and the lower inner surface of the lower body member define a sixth dispensing channel terminating in a sixth dispense opening, wherein the first opening of the upper shim is adjacent one side of the third opening of the lower shim and the second opening of the upper shim is adjacent the opposite side of the third opening of the lower shim such that the third dispense opening is positioned between the first and the second dispense openings in a direction transverse to a dispense direction, and wherein the fourth opening of the upper shim is adjacent one side of the sixth opening of the lower shim and the fifth opening of the upper shim is adjacent the opposite side of the sixth opening of the lower shim such that the sixth dispense opening is positioned between the fourth and the fifth dispense openings in the transverse direction, wherein the lower shim defines the third opening, the sixth opening, and other openings that are each spaced apart from one another by substantially the same distance in the transverse direction.

2. The die of claim 1, wherein the die is a single manifold die.

3. The die of claim 1, wherein a thickness of the upper shim and a thickness of the lower shim are substantially the same.

4. The die of claim 1, wherein the lower body member includes a cavity, wherein the cavity is in fluid communication with the third dispensing channel and the sixth dispensing channel.

5. The die of claim 1, wherein a thickness of the upper shim is different from a thickness of the lower shim.

6. A shim assembly for a multi-lane slot die, the multi-lane slot die having an upper body member and a lower body member, the shim assembly comprising:

an upper shim positioned adjacent to the upper body member, the upper shim defining a first opening, a second opening spaced from the first opening by a first distance, a fourth opening spaced from the second opening by a second distance, and a fifth opening spaced from the fourth opening by the first distance, the first distance being different from the second distance;

a separator shim positioned adjacent to the upper shim, the separator shim having an upper surface and a lower surface, wherein the upper surface of the separator shim, the first opening of the upper shim, and the upper body member define a first dispensing channel, wherein the upper surface of the separator shim, the second opening of the upper shim, and the upper body member define a second dispensing channel, wherein the upper surface of the separator shim, the fourth opening of the upper shim, and the upper body member define a fourth dispensing channel, and wherein the upper surface of the separator shim, the fifth opening of the upper shim, and the upper body member define a fifth dispensing channel; and a lower shim positioned adjacent to the lower surface of the separator shim, the lower shim defining a third opening and sixth opening spaced from the third opening, wherein the lower surface of the separator shim, the third opening of the lower shim, and the lower body member define a third dispensing channel, and wherein the lower surface of the separator shim, the sixth opening of the lower shim, and the lower body member define a sixth dispensing channel, wherein the first opening of the upper shim is adjacent one side of the third opening of the lower shim and the second opening of the upper shim is adjacent the opposite side of the third opening of the lower shim such that the third opening is positioned between the first and the second openings in a direction transverse to a dispense direction, and wherein the fourth opening of the upper shim is adjacent one side of the sixth opening of the lower shim and the fifth opening of the upper shim is adjacent the opposite side of the sixth opening of the lower shim such that the sixth opening is positioned between the fourth and the fifth openings in the transverse direction, wherein the lower shim defines the third opening, the sixth opening, and other openings that are each spaced apart from one another by substantially the same distance in the transverse direction.

7. The shim assembly of claim 6, wherein the first opening or the second opening of the upper shim has a non-linear orientation.

8. The shim assembly of claim 6, wherein a thickness of the upper shim and a thickness of the lower shim are substantially the same.

9. The shim assembly of claim 6, wherein a thickness of the upper shim is different from a thickness of the lower shim.

10. A multi-lane slot die, comprising:

a lower body and an upper body, each of the lower body and the upper body define at least one channel within;

an upper lane shim positioned below the upper body, the upper lane shim defining a first opening, a second opening spaced from the first opening by a first distance, a fourth opening spaced from the second opening by a second distance, and a fifth opening spaced from the fourth opening by the first distance, the first distance being different from the second distance;

a separator shim positioned below the upper lane shim; and a lower lane shim positioned below the separator shim, the lower lane shim defining a third opening and sixth opening spaced from the third opening, wherein the lower body is below the lower lane shim, wherein the first opening of the upper lane shim is adjacent one side of the third opening of the lower lane shim and the second opening of the upper lane shim is adjacent the opposite side of the third opening of the lower lane shim such that the third opening is positioned between the first and the second openings in a direction transverse to a dispense direction to define a first lane, and wherein the fourth opening of the upper lane shim is adjacent one side of the sixth opening of the lower lane shim and the fifth opening of the upper lane shim is adjacent the opposite side of the sixth opening of the lower lane shim such that the sixth opening is positioned between the fourth and the fifth openings in transverse direction to define a second lane, wherein the lower lane shim defines the third opening, the sixth opening, and other openings that are each spaced apart from one another by substantially the same distance in the transverse direction.

11. The die of claim 10, wherein a thickness of the upper lane shim and a thickness of the lower lane shim are substantially the same.

12. The die of claim 10, wherein a thickness of the upper lane shim is different from a thickness of the lower lane shim.

13. The die of claim 10, wherein the second lane is spaced apart from the first lane.

14. The die of claim 10, wherein the first distance is greater than the second distance.

* * * * *